United States Patent
Lindahl

(10) Patent No.: US 9,959,867 B2
(45) Date of Patent: *May 1, 2018

(54) ELECTRONIC DEVICES WITH VOICE COMMAND AND CONTEXTUAL DATA PROCESSING CAPABILITIES

(71) Applicant: Apple Inc., Cupertino, CA (US)

(72) Inventor: Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/207,248

(22) Filed: Jul. 11, 2016

(65) Prior Publication Data

US 2016/0336010 A1  Nov. 17, 2016

Related U.S. Application Data

(63) Continuation of application No. 14/165,520, filed on Jan. 27, 2014, now Pat. No. 9,412,392, which is a (Continued)

(51) Int. Cl.
*G06F 15/18* (2006.01)
*G10L 15/22* (2006.01)
(Continued)

(52) U.S. Cl.
CPC .............. *G10L 15/22* (2013.01); *G06F 3/167* (2013.01); *G06F 17/30023* (2013.01); (Continued)

(58) Field of Classification Search
CPC ...... G06F 3/167; G06F 3/16; G06F 17/30749; G06F 17/30755; G06F 17/30775; G06F 3/0481; G10L 21/06; G10L 15/30; G10L 15/26; G10L 17/26; G10L 15/063; G10L 15/07; G10L 15/1815; G10L 15/22; G10L 15/285; G10L 15/32; H04M 1/271; H04M 1/274516
USPC .... 704/270, 270.1, 275, 250, 231, 257, 201, 704/243; 709/206, 204, 217, 227; 379/93.24, 100.08; 381/77, 311; 700/94
See application file for complete search history.

(56) References Cited

U.S. PATENT DOCUMENTS 5,960,394 A * 9/1999 Gould .................... G09B 19/04
  704/231
6,453,281 B1 * 9/2002 Walters ................. G06F 3/0481
  704/200

(Continued)

*Primary Examiner* — Vijay B Chawan
(74) *Attorney, Agent, or Firm* — Dentons US LLP

(57) ABSTRACT

An electronic device may capture a voice command from a user. The electronic device may store contextual information about the state of the electronic device when the voice command is received. The electronic device may transmit the voice command and the contextual information to computing equipment such as a desktop computer or a remote server. The computing equipment may perform a speech recognition operation on the voice command and may process the contextual information. The computing equipment may respond to the voice command. The computing equipment may also transmit information to the electronic device that allows the electronic device to respond to the voice command.

48 Claims, 7 Drawing Sheets

Related U.S. Application Data continuation of application No. 12/244,713, filed on Oct. 2, 2008, now Pat. No. 8,676,904.

(51) Int. Cl.
  *G10L 15/30* (2013.01)
  *G10L 21/06* (2013.01)
  *G06F 3/16* (2006.01)
  *G06F 17/30* (2006.01)
  *G10L 15/18* (2013.01)

(52) U.S. Cl.
  CPC .......... *G10L 15/1822* (2013.01); *G10L 15/30* (2013.01); *G10L 21/06* (2013.01); *G10L 2015/223* (2013.01)

(56) References Cited

U.S. PATENT DOCUMENTS

| | | | | |
|---|---|---|---|---|
| 7,664,638 B2* | 2/2010 | Cooper | ............... | G04G 21/06 |
| | | | | 704/231 |
| 7,721,301 B2* | 5/2010 | Wong | ............... | G10L 15/26 |
| | | | | 455/563 |
| 7,853,664 B1* | 12/2010 | Wang | ............... | G06Q 30/06 |
| | | | | 379/88.01 |
| 8,032,383 B1* | 10/2011 | Bhardwaj | ............... | G10L 15/30 |
| | | | | 455/420 |
| 8,676,904 B2* | 3/2014 | Lindahl | ............... | G10L 15/30 |
| | | | | 379/93.24 |
| 9,412,392 B2* | 8/2016 | Lindahl | ............... | G10L 15/30 |
| 2002/0010584 A1* | 1/2002 | Schultz | ............... | G06F 3/16 |
| | | | | 704/270 |
| 2004/0199387 A1* | 10/2004 | Wang | ............... | G06Q 30/06 |
| | | | | 704/243 |
| 2006/0217967 A1* | 9/2006 | Goertzen | ............... | G06F 3/16 |
| | | | | 704/201 |
| 2006/0235700 A1* | 10/2006 | Wong | ............... | G10L 15/26 |
| | | | | 704/275 |
| 2007/0041361 A1* | 2/2007 | Iso-Sipila | ............... | H04M 1/271 |
| | | | | 370/352 |
| 2008/0082332 A1* | 4/2008 | Mallett | ............... | G10L 15/07 |
| | | | | 704/250 |
| 2009/0018835 A1* | 1/2009 | Cooper | ............... | H04M 3/527 |
| | | | | 704/257 |
| 2009/0204409 A1* | 8/2009 | Mozer | ............... | G10L 15/30 |
| | | | | 704/275 |

* cited by examiner

ELECTRONIC DEVICES WITH VOICE COMMAND AND CONTEXTUAL DATA PROCESSING CAPABILITIES

CROSS-REFERENCE TO RELATED APPLICATIONS

This application is a continuation of U.S. patent application Ser. No. 14/165,520, filed Jan. 27, 2014, which is a continuation of U.S. patent application Ser. No. 12/244,713, filed on Oct. 2, 2008, now U.S. Pat. No. 8,676,904, issued Mar. 18, 2014. The above referenced applications are incorporated by reference for all purposes as if fully set forth herein.

BACKGROUND

This invention relates generally to electronic devices, and more particularly, to electronic devices such as portable electronic devices that can capture voice commands and contextual information.

Electronic devices such as portable electronic devices are becoming increasingly popular. Examples of portable devices include handheld computers, cellular telephones, media players, and hybrid devices that include the functionality of multiple devices of this type. Popular portable electronic devices that are somewhat larger than traditional handheld electronic devices include laptop computers and tablet computers.

Portable electronic devices such as handheld electronic devices may have limited speech recognition capabilities. For example, a cellular telephone may have a microphone that can be used to receive and process cellular telephone voice commands that control the operation of the cellular telephone.

Portable electronic devices generally have limited processing power and are not always actively connected to remote databases and services of interest. Conventional devices are often not contextually aware. These shortcomings can make it difficult to use conventional portable electronic devices for sophisticated voice-based control functions.

It would therefore be desirable to be able to provide improved systems for electronic devices such as portable electronic devices that handle voice-based commands.

SUMMARY

A portable, electronic device such as a handheld electronic device is provided. The electronic device may have a microphone that is used to receive voice commands, The electronic device may use the microphone to record a user's voice. The recording of the user's voice may be stored as a digital audio file in storage associated with the electronic device.

When the electronic device receives a voice command, the electronic device may store information about the current state of the electronic device and its operating environment as contextual information (metadata). With one suitable arrangement, stored contextual information may include information about the operational state or. the electronic device such as which applications are running on the device and their status. The electronic device may determine which portions to the information on the state to the device are relevant to the voice command and may store only the relevant portions. If desired, the electronic device may determine which contextual information is most relevant by performing a speech recognition operation on the recorded voice command to look for specific keywords.

The electronic device may process voice commands locally or voice commands processing may be performed remotely. For example, the electronic device may transmit one or more recorded voice commands and associated contextual information to computing equipment such as a desktop computer. Captured voice commands and contextual information may also be uploaded to server computing equipment over a network. The electronic device may transmit recorded voice commands and the associated contextual information at any suitable time such as when instructed by a user, as each voice command is received, immediately after each voice command is received, whenever the electronic device is synched with appropriate computing equipment, or other suitable times.

After a recorded voice command and associated contextual information have been transferred to a desktop computer, remote server, or other computing equipment, the computing equipment may process the voice command using a speech recognition operation. The computing equipment may use the results of the speech recognition operation and any relevant contextual information together to respond to the voice command properly. For example, the computing equipment may respond to the voice command by displaying search results or performing other suitable actions). If desired, the computing equipment may convey information back to the electronic device in response to the voice command.

In a typical scenario, a user may make a voice command while directing the electronic device to record the voice command. The user may make the voice command while the electronic device is performing a particular Operation with an application. For example, the user may be using the electronic device to play songs with a media application. While listening to a song, the user may press a record button on the electronic device to record the voice Command "find more like this." The voice command may be processed by the electronic device (e.g., to create a code representative of the spoken command) or may be stored in the form of an audio clip by the electronic device. At an appropriate time, such as when the electronic device is connected to a host computer or a remote server through a communications path, the code or the audio clip corresponding to the spoken command may be uploaded for further processing. Contextual information such as information on the song that was playing in the media application when the voice command was made may be uploaded with the voice command.

A media playback application on a computer such as the iTunes program of Apple Inc. may take an appropriate action in response to an uploaded voice command and associated contextual data. As an example, the media playback application may present a user with recommended songs for purchase. The songs that are recommended may be songs that are similar to the song that was playing on the electronic device when the user captured the audio clip voice command "find more like this."

The computer to which the voice command audio clip is uploaded may have greater processing power available than that available on a handheld electronic device, so voice processing accuracy may be improved by offloading voice recognition operations to the computer from the handheld electronic device in this way. The computer to which the audio clip is uploaded may also have access to more extensive data that would be available on a handheld electronic device such as the contents of a user's full home media library. The computer that receives the uploaded command may also have access to online resources such as an online server database. This database may have been difficult or impossible for the user to access from the handheld device when the voice command was captured.

If desired, the contextual information that is captured by the electronic device in association with a captured voice command may include audio information. For example, a user may record a spoken phrase. Part of the spoken phrase. may represent, a voice command and part of the spoken phrase may include associated contextual information. As an example, a user may be using a mapping application on a handheld electronic device. The device may be presenting the user with a map that indicates the user's current position. The user may press a button or may otherwise instruct the handheld electronic device to record the phrase "I like American restaurants in this neighborhood." In response, the electronic device may record the spoken phrase. The recorded phrase (in this example), includes a command portion ("I like") that instructs the mapping application to create a bookmark or other indicator of the user's preference. The recorded phrase also includes the modifier "American restaurants" to provide partial context for the voice command. Additional contextual information (i.e., the phrase "in this neighborhood) and accompanying position, data (e.g., geographic coordinates from global positioning system circuitry in the device) may also be supplied in conjunction with the recorded voice command. When uploaded, the audio clip voice command and the associated audio clip contextual information can be processed by speech recognition software and appropriate actions taken.

Further features of the invention, its nature and various advantages will be more apparent from the accompanying drawings and the following detailed description of the preferred embodiments.

DETAILED DESCRIPTION

The present invention relates to using voice commands to control electronic systems. Voice commands may be captured with an electronic device and uploaded to computing equipment for further processing. Electronic devices that may be used in this type of environment may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), global positioning system (GPS) devices, and handheld gaming devices. The wireless electronic devices may also be hybrid devices that combine the functionality of multiple conventional devices. Examples of hybrid portable electronic devices include a cellular telephone that includes media player functionality. a gaming device that includes a wireless communications capability, a cellular telephone that includes game and email functions, and a portable device that receives email, supports mobile telephone calls, has music player functionality and supports web browsing. These are merely illustrative examples.

Figure 1:
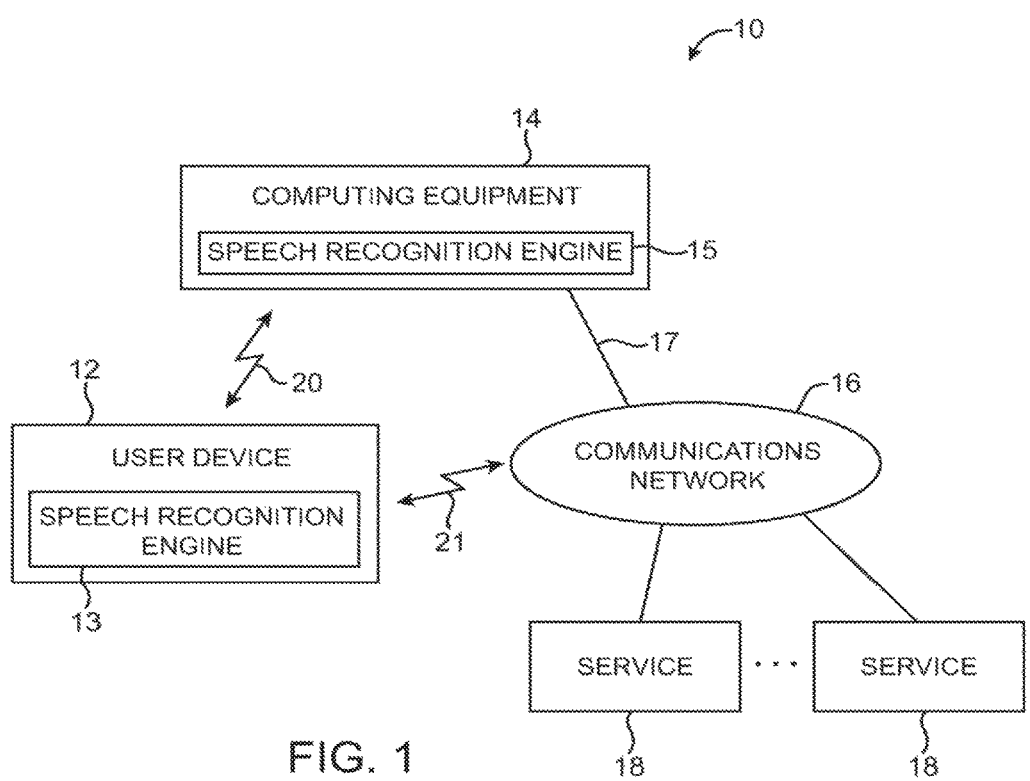
FIG. 1 is a diagram of an illustrative system environment in which a portable electronic device and computing equipment with speech recognition functionality may be used in accordance with an embodiment of the present invention.

An illustrative environment in which a user may interact with system components using voice commands is shown in FIG. 1. A user in system 10 may have an electronic device such as user device 12. User device 12 may be used to receive voice commands (e.g., to record a user's voice). If device 12 has sufficient processing power, the voice commands may be partly or fully processed by user device 12 (e.g., using a speech recognition engine such as speech recognition engine 13). If desired, the voice commands may be transmitted by user device 12 to computing equipment 14 over communications path 20. Voice commands may also be conveyed to remote services 13 over network 16 (e.g., via path 21 or via path 20, equipment 14, and path 17).

When user device 12 transmits voice commands to computing equipment 14, the user device may include contextual information along with the voice commands. User device 12, computing equipment 14, and services 18 may be connected through a network such as communications; network 16. Network 16 may be, for example, a local area network, a wide area network such as the Internet, a wired network, a wireless network, or a network formed from multiple networks of these types. User device 12 may connect to communications network 16 through a wired or wireless communications path such as path 21 or may connect to network 16 via equipment 14. In one embodiment of the invention, user device 12 may transmit voice commands and contextual information to computing equipment 14 through communications network 16. User device 12 may also transmit voice commands and contextual information to computing equipment 14 directly via communications path 20. Path 20 may be, for example, a universal serial bus (USB®) path, or any other suitable wired or wireless path.

User device 12 may have any suitable form factor. For example, user device 12 may be provided in the form of a handheld device, desktop device, or even integrated as part of a larger structure such as a table or wall. With one particularly suitable arrangement, which is sometimes described herein as an example, user device 12 may be provided with a handheld form factor. For. example, device 12 may be a handheld electronic device. Illustrative handheld electronic devices that may be provided with voice command recording capabilities include cellular telephones, media players, media players with wireless communications capabilities, handheld computers (also sometimes called personal digital assistants), global positioning system (GPS) devices, handheld gaming devices, and other handheld devices. If desired, user device 12 may be a hybrid device that combines the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, supports web browsing, and includes media player functionality. These are merely illustrative examples.

Computing equipment 14 may include any suitable computing equipment such as a personal desktop computer, a laptop computer, a server, etc. With one suitable arrangement, computing equipment 14 is a computer that establishes a wired or wireless connection with user device 12. The computing equipment may be a server (e.g., an internet server), a local area network computer with or without internet access, a user's own personal computer, a peer: device (e.g., another user device 1.2), any other suitable computing equipment, and combinations of multiple pieces of computing equipment. Computing equipment 14 may be used to implement applications such as media playback applications (e.g., iTunes® from Apple Inc.), a web browser, a mapping application, an email application, a calendar application, etc.

Computing equipment 18 (e.g., one or more servers) may be associated with one or more online services.

Communications path 17 and the other paths in system 10 such as path 20 between device 12 and equipment 14, path 21 between device 12 and network 16, and the paths between network 16 and services 18 may be based on any suitable wired or wireless communications technology. For example, the communications paths in system 10 may be based on wired communications technology such as coaxial cable, copper wiring, fiber optic cable, universal serial bus (USB®), IEEE 1394 (FireWire®), paths using serial protocols, paths using parallel protocols, and Ethernet paths. Communications paths in system 10 may, if desired, be based on wireless communications technology such as satellite technology, radio-frequency (RF) technology, wireless universal serial bus technology, and Wi-Fi® or Bluetooth® 802.11 wireless link technologies. Wireless communications paths in system 10 may also include cellular telephone bands such as those at 850 MHz, 900 MHz, 1800 MHz, and 1900 MHz (e.g., the main Global System for Mobile Communications or GSM cellular telephone bands) , one or more proprietary radio-frequency links, and other local and remote wireless links. Communications paths in system 10 may also be based on wireless signals sent using light (e.g., using infrared communications) or sound (e.g., using acoustic communications).

Communications path 20 may be used for one-way or two-way transmissions between user device 12 and computing equipment 14. For example, user device 12 may transmit voice commands and contextual information to computing equipment 14. After receiving voice commands and contextual information from user device 12, computing equipment 14 may process the voice commands and contextual information using a speech recognition engine such as speech recognition engine 15. Engine 15 may be provided as a standalone software component or may be integrated into a media playback application or other application. If desired, computing equipment 14 may transmit data signals to user device 12. Equipment 14 may, for example, transmit information to device 12 in response to voice commands transmitted by device 12 to system 14. For example, when a voice command transmitted by device 12 includes a request to search for information, system 14 may transmit search results back to device 12.

Communications network 16 may be based on any suitable communications network or networks such as a radio-frequency network, the Internet, an Ethernet network, a wireless network, a Wi-Fi® network, a Bluetooth® network, a cellular telephone network, or a combination of such networks.

Services 18 may include any suitable online services. Services 18 may include a speech recognition service (e.g., a speech recognition dictionary), a search service (e.g., a service that searches a particular database or that performs Internet searches), an email service, a media service, a software update service, an online business service, etc. Services 18 may communicate with computing equipment 14 and user device 12 through communications network 16.

In typical user, user device 12 may be used to capture voice commands from a user during the operation of user device 12. For example, user device 12 may receive one or more voice commands during a media playback operation (e.g., during playback of a music file or a video file). User device 12 may then store information about its current operational state as contextual information. User device 12 may record information related to the current media playback operation. Other contextual information may foe stored when other applications are running on device 12. For example, user device 12 may store information related to a web-browsing application, the location of user device 12, or other appropriate information on the operating environment for device 12. Following the reception of a voice command, user device 12 may, if desired, perform a speech recognition operation on the voice command. User device 12 may utilize contextual information about the state of the user device at the time the voice command was received during the associated speech recognition operation.

In addition to or in lieu of performing a local speech recognition operation on the voice command using engine 13, user device 12 may forward the captured voice command audio clip and, if desired, contextual information to computing equipment 14 for processing. Computing equipment 14 may use engine 15 to implement speech recognition capabilities that allow computing equipment 14 to respond to voice commands that user device 12 might otherwise have difficulties in processing. For example, if user device 12 were to receive a voice command to "find Italian restaurants near me," user device 12 might not be able to execute the voice command immediately for reasons such as an inability to perform adequate speech processing due to a lack of available processing power, an inability to perform a search requested by a voice command due to a lack of network connectivity, etc. In this type of situation, device 12 may save the voice command (e.g., as a recorded audio file of a user's voice) and relevant contextual information (e.g., the current location of user device 12) for transmission to computing equipment 14 for further processing of the voice command. Device 12 may transmit voice commands and contextual information to computing equipment 14 at any suitable time (e.g., when device 12 is synched with computing equipment 14, as the voice commands are received by device 12, whenever device 12 is connected to a communications network, etc.). These transmissions may take place simultaneously or as two separate but related transmissions.

With one suitable arrangement, device 12 may save all available contextual information, with another arrangement, device 12 may perform a either a cursory or a full speech recognition operation on voice commands to determine what contextual information is relevant and then store only the relevant contextual information. As an example, user device 12 may search for the words "music" and "location" in a voice command to determine whether the contextual information stored in association with the voice command should include information related to a current media playback operation or should include the current location of user device 12 (e.g., which may be manually entered by a user or may be determined using a location sensor).

Figure 2:
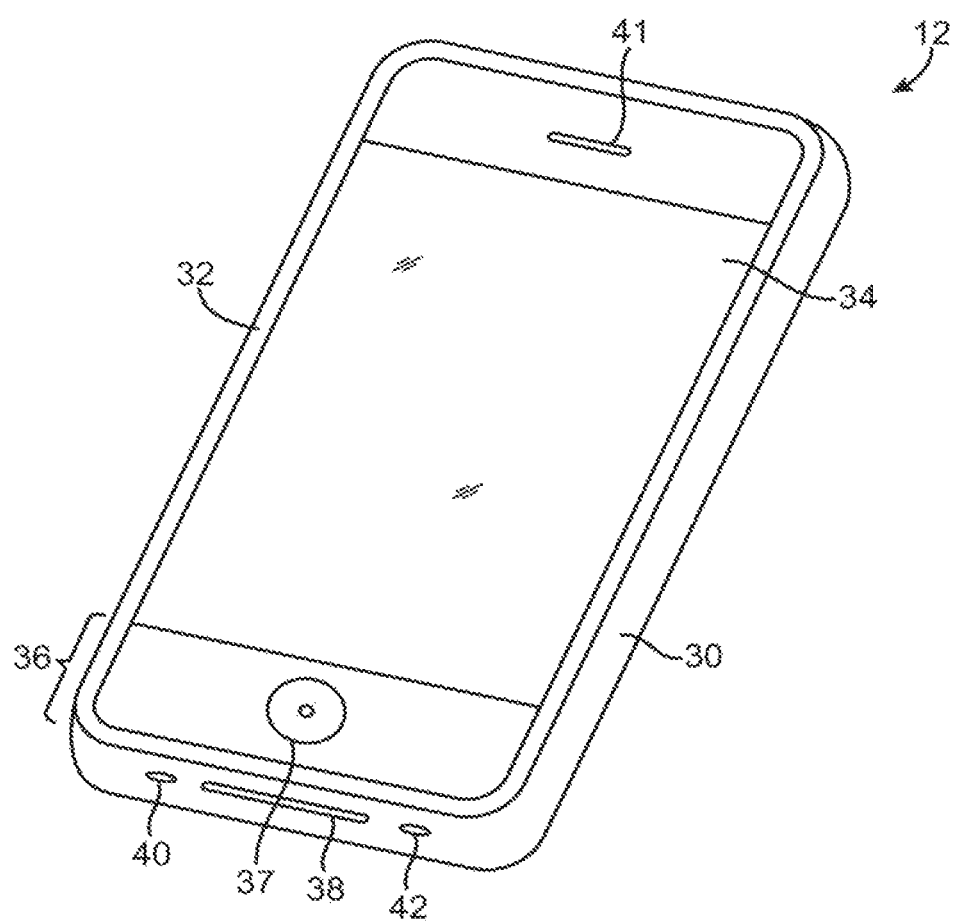
FIG. 2 is a perspective view of an illustrative portable electronic device in accordance with an embodiment of the present invention.

An illustrative user device 12 in accordance with an embodiment of the present invention is shown in FIG. 2. User device 12 may be any suitable electronic device such as a portable or handheld electronic device.

User device 12 may handle communications over one or more wireless communications bands such as local area network bands and cellular telephone network bands.

Device 12 may have a housing 30. Display 34 may be attached to housing 30 using bezel 32. Display 34 may be a touch screen liquid crystal display (as an example).

Device 12 may have a microphone for receiving voice commands. Openings 42 and 40 may, if desired, form microphone and speaker ports. With one suitable arrangement, device 12 may have speech recognition capabilities (e.g., a speech recognition engine that can be used to receive and process voice commands from a user). Device 12 may also have audio capture and playback capabilities. Device 12 may be able to receive voice commands from a user and other audio though a microphone (e.g., formed as part of one or more ports such as openings 30 and 42). Port 41 may be, for example, a speaker sport. If desired, device 12 may activate its audio recording and/or speech recognition capabilities (e.g., device 12 may begin recording audio signals associated with a user's voice with a microphone) in response to user input. For example, device 12 may present an on-screen selectable option to the user to activate speech recognition functionality. Device 12 may also have a user input device such as button 37 that is used to receive user input to activate speech recognition functionality.

User device 12 may have other input-output devices. For example, user device 12 may have other buttons. Input-output components such as port 38 and one or more input-output jacks (e.g., for audio and/or video) may be used to connect device 12 to computing equipment 14 and external accessories. Button 37 may be, for example, a menu button. Port 38 may contain a 30-pin data connector (as an example). Suitable user input interface devices for user device 12 may also include buttons such as alphanumeric keys, power on-off, power-on, power-off, voice memo, and other specialized buttons, a touch pad, pointing stick, or other cursor control device, or any other suitable interface for controlling user device 12. In the example of FIG. 2, display screen 34 is shown as being mounted on the front face of user device 12, but; display screen 34 may, if desired, be mounted on the rear face of user device 12, on a side of user device 12, on a flip-up portion of user device 12 that is attached to a main body portion of user device 12 by a hinge (for example), or using any other suitable mounting arrangement. Display 34 may also be omitted Although shown schematically as being formed on the top face of user device 12 in the example of FIG. 2, buttons such as button 37 and other user input interface devices may generally be formed on any suitable portion of user device 12. For example, a button such as button 37 or other user interface control may be formed on the side of user device 12. Buttons and other user interface controls can also be located on the top face, rear face, or other portion of user device 12. If desired, user device 12 can be controlled remotely (e.g., using an infrared remote control, a radio-frequency remote control such as a Bluetooth® remote control, etc.). With one suitable arrangement, device 12 may receive voice commands and other audio through a wired or wireless headset or other accessory. Device 12 may also activate its speech recognition functionality in response to user input received through a wired or wireless headset (e.g., in response to a button press received on the headset).

Device 12 may use port 38 to perform a synchronization operation with computing equipment 14. With one suitable arrangement, device 12 may transmit voice commands and contextual information to computing equipment 14. For example, during a media playback operation, device 12 may receive a voice command to "find more music like this." If desired, device 12 may upload the voice command and relevant contextual information (e.g., the title and artist of the media file that was playing when the voice command was received) to computing equipment 14. Computing equipment 14 may receive and process the voice command and relevant Contextual information and may perform a search, for music that is similar to the media file that was playing when the voice command was received. Computing equipment 14 may then respond by displaying search results, purchase recommendations, etc.

Device 12 may receive data signals from computing equipment 14 in response to uploading voice commands and contextual information. The data received by device 12 from equipment 14 in response to voice commands and contextual information may be used by device 12 to carry out requests associated with the voice commands. For example, after processing the voice command and contextual information, computing equipment 14 may transmit results associated with the voice command to user device 12 which may then display the results.

Figure 3:
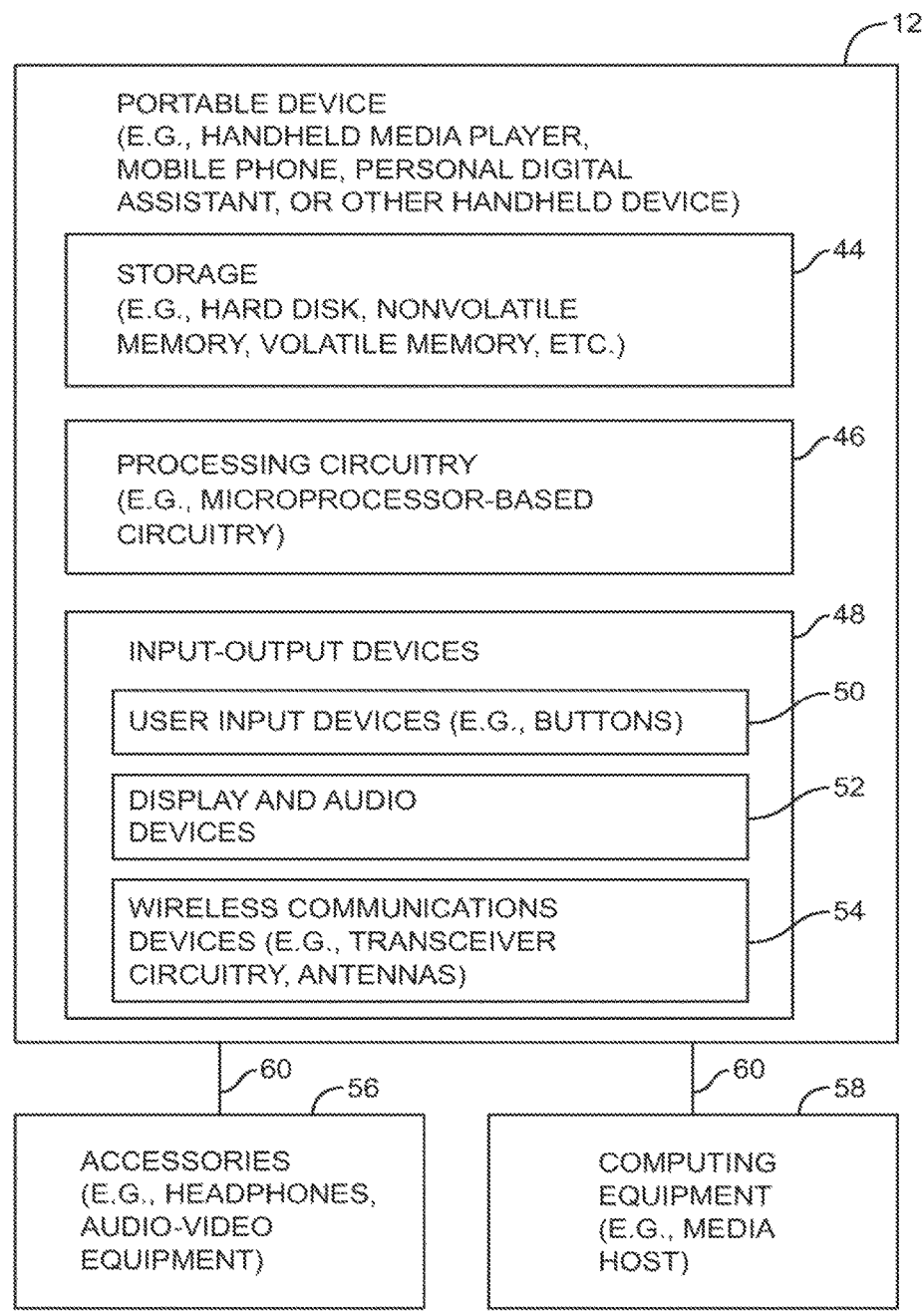
FIG. 3 is a schematic diagram of an illustrative portable electronic device in accordance with an embodiment of the present invention.

A schematic diagram of an embodiment of an illustrative user device 12 is shown in FIG. 3. User device 12 may be a mobile telephone, a mobile telephone with media player capabilities, a media player, a handheld computer, a game player, a global positioning system (GPS) device, a combination of such devices, or any other suitable electronic device such as a portable device.

As shown in FIG. 3, user device 12 may include storage 44. Storage 44 may include one or more different types of storage such as hard disk drive storage, nonvolatile memory (e.g., flash memory or other electrically-programmable-read-only memory), volatile memory (e.g., battery-based static or dynamic random-access-memory), etc. Storage 44 may be used to store voice commands and contextual information about the state of device 12 when voice commands are received.

Processing circuitry 46 may be used to control the operation of user device 12. Processing circuitry 46 may be based on a processor Such as a microprocessor and other suitable integrated circuits. With one suitable arrangement, processing circuitry 4 6 and storage 44 are used to run software on user device 12, such as speech recognition applications, internet browsing applications, voice-over-internet-protocol (VOIP) telephone call applications, email applications, media playback applications, operating system functions (e.g., operating system functions supporting speech recognition capabilities), etc. Processing circuitry 46 and storage 44 may be used in implementing analog-to-digital conversion functions for capturing audio and may be used to implement speech recognition functions.

Input-output devices 48 may be used to allow data to be supplied to user device 12 and to allow data to be provided from user device 12 to external devices. Display screen 34, button 37, microphone port 42, speaker port 40, speaker port 41, and dock connector port 38 are examples of input-output devices 48.

Input-output devices 48 can include user input devices SO such as buttons, touch screens, joysticks, click wheels, scrolling wheels, touch pads, key pads, keyboards, microphones, cameras, etc. A user can control the operation of user device 12 by supplying commands through user input devices 50. Display and audio devices 52 may include liquid-crystal display (LCD) screens or other screens, light-emitting diodes (LEDs), and other components that present visual information and status data. Display and audio devices 52 may also include audio equipment such as speakers and other devices for creating sound. Display and audio devices 52 may contain audio-video interface equipment such as jacks and other connectors for external headphones, microphones, and monitors.

Wireless communications devices 54 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications circuitry in circuitry 54).

User device 12 can communicate with external devices such as accessories 56 and computing equipment 58, as shown, by paths 60. Paths 60 may include wired and wireless paths (e.g., bidirectional wireless paths). Accessories 56 may include headphones (e.g., a wireless cellular headset or audio headphones) and audio-video equipment (e.g., wireless speakers, a game controller, or other equipment that receives and plays audio and video content).

Computing equipment 58 may be any suitable computer such as computing equipment 14 or computing equipment 18 of FIG. 1. With one suitable arrangement, computing equipment 58 is a computer that has an associated wireless access point (router) or an internal or external wireless card that establishes a wireless connection with user device 12. The computer may be a server (e.g., an internet server), a local area network computer with or without internet access, a user's own personal computer, a peer device (e.g., another user device 12), or any other suitable computing equipment. Computing equipment 58 may be associated with one or more online services. A link such as link 60 may be used to connect device 12 to computing equipment such as computing equipment 14 of FIG. 1.

Wireless communications devices 54 may be used to support local and remote wireless links. Examples of local wireless links include infrared communications, Wi-Fi® (IEEE 802.11), Bluetooth®, and wireless universal serial bus (USB) links.

If desired, wireless communications devices 54 may include circuitry for communicating over remote communications links. Typical remote link communications frequency bands include the cellular telephone bands at 850 MHz, 900 MHz, 1800 MHz, and 1900 MHz, the global positioning system (GPS) band at 1575 MHz, and data service bands such as the 3G data communications band at 2170 MHz band (commonly referred to as UMTS or Universal Mobile Telecommunications System). In these illustrative remote communications links, data is transmitted over links 60 that are one or more miles long, whereas in short-range links 60, a wireless signal is typically used to convey data over tens or hundreds of feet.

Figure 4:
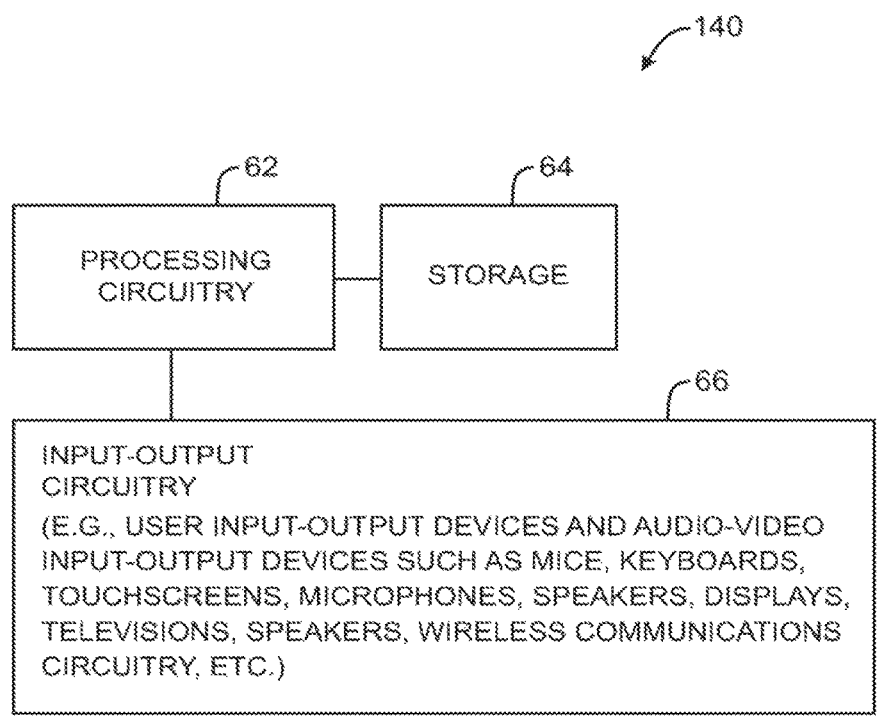
FIG. 4 is a schematic diagram of illustrative computing equipment that may be used in processing voice commands from a portable electronic device in accordance with, an embodiment of the present invention.

A schematic diagram of an embodiment of illustrative computing equipment 140 is shown in FIG. 4. Computing equipment 140 may include any suitable computing equipment such as a personal desktop computer, a laptop computer, a server, etc. and may be used to implement computing equipment 14 and/or computing equipment 18 of FIG. 1. Computing equipment 140 may be a server (e.g., an internet server), a local area network computer with or without internet access, a user's own personal computer, a peer: device (e.g., another user device 12), other suitable computing equipment, or combinations of multiple pieces of such computing equipment. Computing equipment 140 may be associated with one or more services such as services 18 of FIG. 1.

As shown in FIG. 4, computing equipment 140 may include storage 64 such as hard disk drive storage, nonvolatile memory, volatile memory, etc. Processing circuitry 62 may be used to control the operation of computing equipment 140. Processing circuitry 62 may be based on one or more processors such as microprocessors, microcontrollers, digital signal processors, application specific integrated circuits, and other suitable integrated circuits. Processing circuitry 62 and storage 64 may be used to run software on computing equipment 140 such as speech recognition applications, operating system functions, audio capture applications, other applications with voice recognition and/or audio capture functionality, and other software applications.

Input-output circuitry 66 may be used to gather user input and other input data and to allow data to be provided from computing equipment 140 to external devices. Input-output circuitry 66 can include devices such as mice, keyboards, touch, screens, microphones, speakers, displays, televisions, speakers, wired communications circuitry, and wireless communications circuitry.

Figure 5:
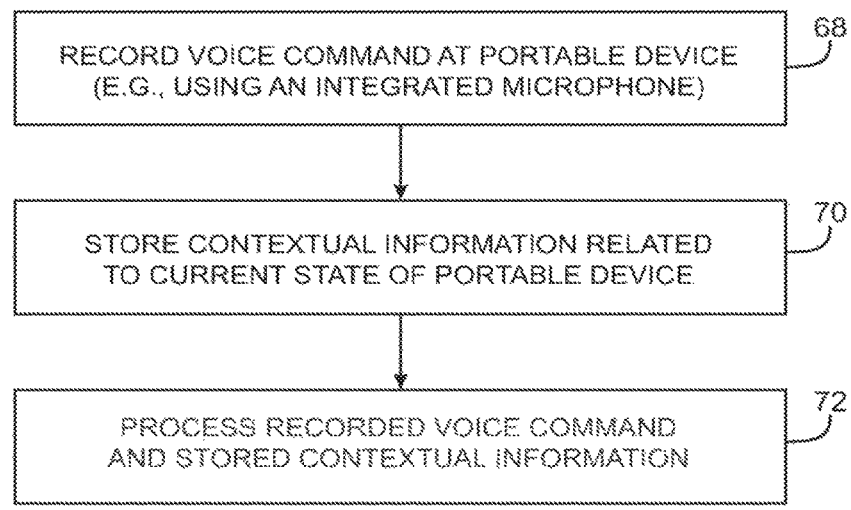
FIG. 5 is a flowchart of illustrative steps involved in using a portable electronic device to receive and process voice commands in accordance with an embodiment of the present invention.

Illustrative steps involved in using an electronic device such as user device 12 to gather voice commands and contextual information are shown in FIG. 5.

At step 68, an electronic device such as user device 12 of FIG. 1 may receive a voice command. Voice commands may be received from a user using an integrated microphone such as a microphone in microphone port 42. If desired, voice commands may be received using an external microphone (e.g., a microphone in an accessory such as a wired or wireless headset).

Voice commands may be recorded (e.g., stored) in storage such as storage 44 of FIG. 3. Voice commands may be stored as a digital audio recording (e.g., an MP3 audio clip). With one suitable arrangement, voice commands may be stored in long-term storage (e.g., nonvolatile memory, hard disk drive storage, etc.) so that the voice commands may be processed at a later time. If desired, voice commands may be stored in short-term storage (e.g., volatile memory).

At step 70, user device 12 may store contextual information related to the current state of the user device. The contextual information may include any information that is available about the current state of the user device. For example, the contextual information may include information related to a current media playback operation (e.g., media attributes such as a track name, a title, an artist name, an album name, year, genre, etc.), a current web-browsing operation (e.g., a current web-address), the geographic location of the user device (e.g., a location determined using a location sensor, a location derived from information associated with communications path 20 and 21 such as which cellular telephone network or other network the device is connected to, or location data manually entered by a user), the current date and time, a telephone operation (e.g., a telephone number or contact information associated with a current or previous telephone, call), information from other software applications running on device 12 such as mapping applications, business productivity applications, email applications, calendar applications, calendar applications, games, etc. The contextual information may include contextual information related to operations occurring in the background of the operation of device 12. For example, contextual information may include media playback information in addition to web browsing information when user device 12 is being used to browse the Internet while listening to music in the background.

With one suitable arrangement, user device 12 may store voice commands as audio clips without performing local voice recognition operations. If desired, user device 12 may perform a speech recognition operation on a voice command. The results of this operation may be used to convert the command into a code or may be used to determine which contextual information is most relevant. Device 12 may then store this most relevant contextual information. For example, user device 12 may perform a preliminary speech recognition operation to search for specific keywords such as "music," "location," "near," and other suitable keywords to determine which contextual information would be most relevant. With this type of arrangement, keywords such as "location" and "near" may indicate that location information is relevant while keywords such as "music" may indicate that information associated with a current media playback operation is most likely to be relevant.

A voice command that has been recorded in step 68 may be processed at step 70. User device 12 may process the voice command using a speech recognition engine. When user device 12 processes the voice command, user device 12 may also process contextual information stored in step 70. With one suitable arrangement, user device 12 may process each voice command with, a speech recognition application that runs on processing circuitry such as circuitry 46. If the speech recognition application is able to successfully recognize the speech in the voice command, user device 12 may attempt to perform the action or actions requested by the voice command using any relevant contextual information. For example, the voice command "find more music like this" may be interpreted by user device 12 to mean that the user device should perform a search for music that has the same genre as music that was playing when the voice command was received. User device 12 may therefore perform a search for music using the genre of the currently playing music as a search criteria.

With one suitable arrangement, voice commands may be associated with a list of available media files on user device 12 so that the list of media files serve as contextual information. Image captures and captured audio and/or video clips can also serve as contextual information. For example, user device 12 may have an integrated camera that can be used to take pictures. In this example, user device 12 may allow a user to supply a voice command and to associate the voice command with, one or more pictures so that the pictures serve as contextual information. In one example of this type of arrangement, if user device 12 receives the voice command "identify this car" and receives information associating the voice command with a picture containing a car, user device 12 may transmit the picture to a service capable of identifying cars from pictures.

Figure 6:
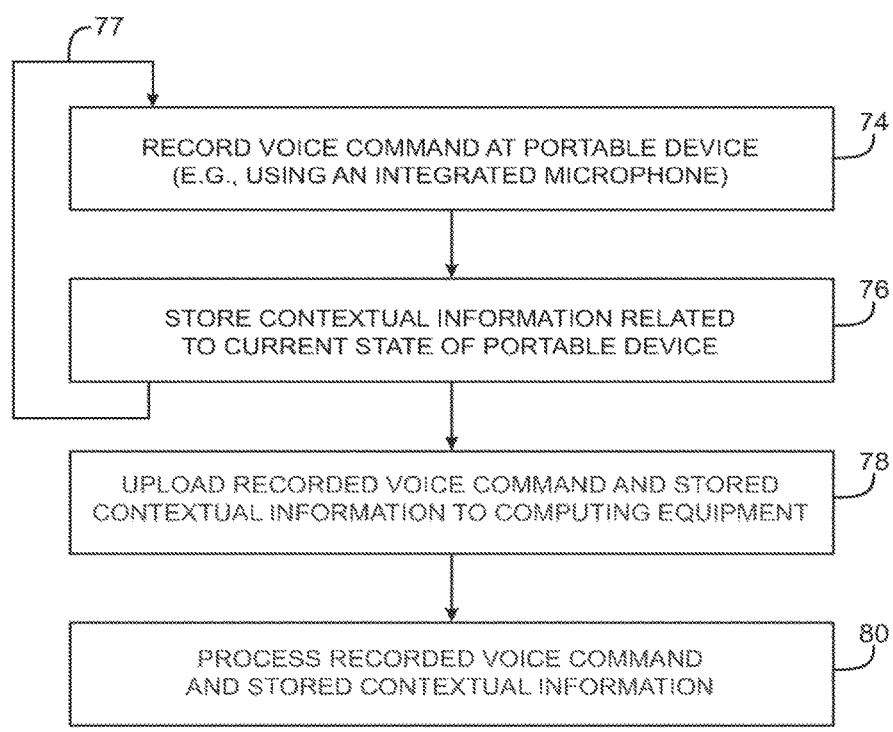
FIG. 6 is a flowchart of illustrative steps involved in using a portable electronic device to receive and upload voice commands and using computing equipment to process the voice commands in accordance with an embodiment of the present invention.

Illustrative steps involved in using a portable electronic device such as user device 12 to receive and upload voice commands and in using computing equipment such as computing equipment 14 to process the uploaded voice commands are shown in FIG. 6.

At step 74, user device 12 may record a voice command. The voice command may be recorded as an audio clip when a user pressed and releases a record button or supplies other user input directing device 12 to capture the voice command. The voice command may be digitized by device 12 and stored in storage associated with user device 12 such as storage 44.

At step 76, user device 12 may store contextual information in storage. If desired, user device 12 may store only the contextual information that is relevant to the captured voice command. As indicated by line 77, the operations of steps 74 and 76 may be repeated (e.g., user device 12 may record numerous voice commands each of which may be associated with corresponding contextual information).

If desired, user device 12 may present the user with an opportunity to record an audio clip that includes both a voice command and contextual information. An example of a possible audio clip that includes both a voice command and contextual information and that could be received by user device 12 is "create new event for Sunday, July 18th: James's Birthday." In this example, the voice command corresponds to the user's desire for user device 12 to create a new calendar event and the relevant contextual information is included in the audio clip (e.g., the date of the new event "Sunday, July 18th" and the title of the new event "James's Birthday").

At step 78, user device 12 may upload recorded voice commands and stored contextual information to computing equipment such as equipment 14 or equipment 18. User device 12 may upload recorded voice commands and stored contextual information to computing equipment 14 or equipment 18 using any suitable communications path. For example, user device 12 may transmit voice commands and contextual information to equipment 14 directly over communications path 20, indirectly through communications network 16 over paths 17 and 21, or may upload them to equipment 18 over network 16.

The operations of step 78 may be performed at any suitable time. For example, user device 12 may upload stored voice commands and contextual information whenever user device 12 is coupled to the computing equipment directly (e.g., through a communications path such as path 20 which may be a Universal Serial Bus® communication path), whenever user device 12 is coupled to computing equipment indirectly (e.g., through communication network 16 and paths 17 and 21), whenever voice commands are recorded at step 74 and a communications link to the computing equipment is available, on demand (e.g., when user device 12 receives a command from a user to process voice commands by uploading them to the computing equipment), at regular intervals (e.g., every ten minutes, every half hour, every hour, etc.), and at combinations of these and other suitable times.

At step 80, computing equipment such as computing equipment 14 or 18 may process voice commands and contextual information from user device 12. Computing equipment 14 or 18 may process voice commands using speech recognition software (e.g., speech recognition engines) running on processing circuitry 62 of FIG. 4, as an example. Computing equipment 14 or 18 may utilize contextual information in processing the associated voice command. For example, when a voice command requests that more music be found that is similar to a given media file, computing equipment 14 or 18 may perform a search, of music based on information about the given media file. In another example, the voice command "find nearby retail establishments" may be interpreted by user device 12, computing equipment 14, or equipment 18 to mean that a search should be performed for retail, establishments that are within a given distance of user device 12. The given distance may be arty suitable distance such as a pre-specified distance (e.g., walking distance. one-half mile, one mile, two miles, etc.) and a distance specified as part of the voice command. The voice command may also specify which types of retail establishments the search should include. For example, the voice command "find Italian restaurants within three blocks" specifies a type of retail establishment (restaurants), a particular style of restaurant (Italian), and the given distance over which the search should be performed (within three blocks of the geographical location of the user device that received the voice command).

If desired, computing equipment 14 or 18 may fulfill a voice command directly. For example, when user device 12 is connected to computing equipment 14 or 13 (e.g., when device 12 is synched with the equipment), the computing equipment may display results related to the voice command (e.g., a list of similar music) and may perform any appropriate action (e.g., transmit a picture to a car-identification service and then display any results returned by the car-identification service).

With another suitable arrangement, computing equipment 14 or 13 may transmit information related to processing and responding to the voice command to user device 12. In response, user device 12 may then respond to the voice command. This type of arrangement may be particularly beneficial when user device 12 and the computing equipment are not physically located near each Other (e.g., when user device 12 is only connected to computing equipment 14 or 18 through long-range communications paths such as through a communications network such as the Internet).

Figure 7:
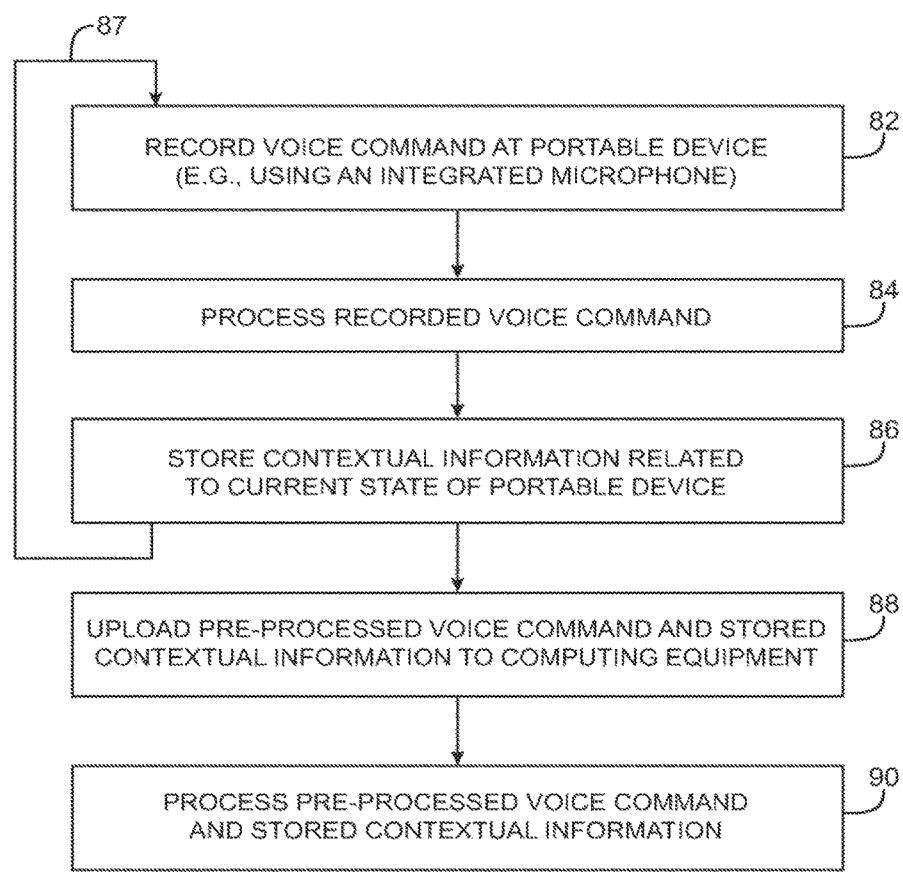
FIG. 7 is a flowchart of illustrative steps involved in using a portable electronic device to receive, process, and upload voice commands and using computing equipment to process the voice commands in accordance with and embodiment of the present invention.

Illustrative steps involved in using a portable electronic device such as user device 12 to receive, process, and upload voice commands and in using computing equipment such as computing equipment 14 or 18 to process the voice commands are shown in FIG. 7.

At step 82, user device 12 may record a voice command. The voice command may be stored in storage such as storage 44.

Following step 82, user device 12 may process the recorded voice command at step 84. User device 12 may process the voice command at any suitable time (e.g., as the voice command is received or at any later time). If desired, user device 12 may perform a preliminary speech recognition operation to determine which portions of the available contextual information are relevant to the voice command. Device 12 may search for specific keywords in the voice command to determine which portions of the available contextual information are relevant, as an example. With another suitable arrangement, device 12 may perform a more thorough speech recognition operation. In this type of arrangement, device 12 may determine that it is able to respond to the voice command immediately (e.g., by executing an operation or by retrieving appropriate information from an appropriate service 18).

If desired, user device 12 may be trained to one or more users' voices. For example, user device 12 may instruct each user to speak a specific set of sample words in order to train its speech recognition operations to be as accurate as possible for each particular user.

When device 12 is not able to fulfill the voice command at the time the voice command is received, device 12 may store contextual information related to the state of user device 12 at the time the voice command was received in storage (step 86).

As illustrated by line 87, the operations of steps 82, 84, and 86 may optionally be repeated as user device 12 receives numerous voice commands that it is not able to fulfill (e.g., respond to) without further processing by computing equipment 14 or 13.

At step 88, user device 12 may upload one or more voice commands and contextual information associated with each of the voice commands to computing equipment 14 or 18. User device 12 may upload the voice commands to computing equipment 14 or 18 at any suitable time.

At step 90, computing equipment 14 or 18 may process voice commands received from user device 12. Computing equipment 14 or 13 may utilize the contextual information associated with each voice command in processing each of the voice commands (e.g., in using a speech recognition engine to process each voice command and associated contextual information).

If desired, computing equipment 14 or 18 may be trained to one or more users' voices. For example, computing equipment 14 or 18 may instruct each user to speak a specific set of sample words in order to train its speech recognition operations to be as accurate as possible for each particular user. With one suitable arrangement, computing equipment 14 or 18 and user device 12 may share information related to training speech recognition operations to particular users.

The voice commands processed and stored by user device 12 and processed by computing equipment 14 or 18 may include any suitable voice commands. With, one suitable arrangement, user device 12 arid computing equipment 14 or 18 may each have a respective dictionary of voice commands that can be recognized using the speech recognition capabilities of user device 12 and computing equipment 14 or 18. Because computing equipment 14 or 18 may include any type of computing equipment including desktop computers and computer servers which generally have relatively large amount of processing and storage capabilities compared to portable devices such as user device 12, computing equipment 14 or 18 will generally have a larger dictionary of voice commands that the equipment can recognize using speech recognition operations. By uploading voice commands and contextual information from user device 12 to computing equipment 14 or 18, the probability that a given voice command can be successfully processed and fulfilled will generally increase. With one suitable arrangement, user device 12 may have a closed dictionary (e.g., a dictionary containing only specific keywords and phrase) whereas computing equipment 14 or 18 may have an open dictionary (e.g., a dictionary that can include essentially any word or phrase and which, may be provided by a service such as one of services 18).

When user device 12 is not connected to communications networks such as network 16 or to computing equipment 14 or 18 over path 20, user device 12 may not always have the capabilities required to satisfy (e.g., fulfill) a particular voice Command at the time the voice command is received. For example, if user device 12 is not connected to a communications network and receives a voice command to "find more music like this," user device 12 may be able to determine, using a speech recognition dictionary associated with device 12, that a user wants device 12 to perform a search for music that matches the profile of music currently playing through device 12. However, because user device 12 is not Currently connected to a communications network, device 12 may not be able to perform the search immediately. In this situation, device 12 may store the voice command and perform the requested action later at an appropriate time (e.g., when device 12 is connected to computing equipment 14 or 18 or when device 12 connects to a service at equipment 18 through a communications network such as network 16).

Because user device 12 can upload voice commands and contextual information to computing equipment 14 or 18, user device 12 may be able to support an increased amount of voice commands and may be able to respond in a more complete manner than if user device 12 performed speech, recognition, operations without the assistance of equipment 14 or 18. For example, user device 12 can record voice commands that it is unable to comprehend using its own speech recognition capabilities and can transmit the voice commands and relevant contextual information to computing equipment 14 or 18, which may be more capable and therefore more able to comprehend and respond to the voice commands.

As the foregoing demonstrates, users can capture voice commands on device 12 for immediate processing in a device that includes a speech recognition (voice processing) engine. In the event that no speech recognition processing functions are implemented on device 12 or when it is desired to offload voice recognition functions to remote equipment, device 12 may be used to capture an audio clip that includes a voice command.

Any suitable user interface may be used to initiate voice command recording operations, for example, a dedicated button such as a record button may be pressed to initiate voice command capture operations and may be released to terminate voice command capture operations. The start and end of the voice command may also be initiated using a touch screen and on-screen options. The. end of the voice command clip may be determined by the expiration of a timer (e.g., ail clips may be three seconds long) or device 12 may terminate recording when the ambient sound level at the microphone drops below a given threshold.

Recorded audio clips may be digitized in device 12 using any suitable circuitry. As an example, device 12 may have a microphone amplifier and associated analog-to-digital converter circuitry that digitizes audio clips. Audio clips may be compressed (e.g., using file formats such as the MP3 format).

Contextual information may be captured concurrently. For example, information may be. stored on. the current operating state of device 12 when a user initiates a voice command capture operation. Stored contextual information may include information such as information on which applications are running on device 12 and their states, the geographic location of device 12 (e.g., geographic coordinates), the orientation of device 12 (e.g., from an orientation sensor in device 12), information from other sensors in device 12, etc.

Because voice command processing can be deferred until device 12 is connected to appropriate computing equipment, it is not necessary for device 12 to immediately communicate with the computing equipment. As user may, for example, capture voice commands while device 12 is offline (e.g., when a user is in an airplane without network connectivity). Device 12 may also be used to capture voice commands that are to be executed by the user's home computer, even when the user's home computer is not powered.

Later, when device 12 is connected to the user's home computer and/or an online service, the captured voice commands can be uploaded and processed by this external computing equipment. The contextual information that was captured when the voice command was captured may help the external computing equipment (e.g., the user's computer or a remote server) properly process the voice command. The computing equipment to which the voice command is uploaded may be able to access data that was unavailable to device 12 when the command was captured, such as information on the contents of a user's media library or other database, information that is available from an online repository, etc. The computing equipment to which the voice command and contextual information were uploaded may also be able to take actions that are not possible when executing commands locally on device 12. These actions may include actions such as making adjustments to a database on the computing equipment, making online purchases, controlling equipment that is associated with or attached to the computing equipment, etc.

The foregoing is merely illustrative of the principles of this invention and various modifications can be made by those skilled in the art without departing from the scope and spirit of the invention.

What is claimed is:

1. A method for processing voice commands, comprising:
at an electronic device with one or more processors and memory:
receiving a voice command containing a request for media;
storing contextual information of the electronic device, the contextual information related to a media playback operation occurring at the electronic device while receiving the voice command;
after receiving the voice command and storing the contextual information, transmitting at least a portion of the voice command and the stored contextual information from the electronic device to remote computing equipment; and
receiving, from the remote computing equipment, media results obtained based on the voice command and the contextual information.

2. The method of claim 1, wherein the media playback operation comprises a media player application of the electronic device playing a media object while receiving the voice command.

3. The method of claim 2, wherein the media results include a second media object having a same attribute as the media object being played by the media player application.

4. The method of claim 2, wherein the contextual information includes one or more attributes related to the media object.

5. The method of claim 1, wherein the contextual information comprises a media attribute related to the media playback operation.

6. The method of claim 5, wherein the media attribute comprises a track name.

7. The method of claim 5, wherein the media attribute comprises a title.

8. The method of claim 5, wherein the media attribute comprises an artist name.

9. The method of claim 5, wherein the media attribute comprises an album name.

10. The method of claim 5, wherein the media attribute comprises a year.

11. The method of claim 5, wherein the media attribute comprises a genre.

12. The method of claim 1, wherein the voice command does not explicitly describe an attribute required to satisfy the request for media.

13. The method of claim 1, wherein the request for media is a request to search for media objects.

14. The method of claim 1, wherein the voice command includes an ambiguous term that refers to the contextual information.

15. The method of claim 1, wherein the contextual information comprises media files on the electronic device.

16. The method of claim 1, wherein the contextual information comprises information associated with a web-browsing operation of an Internet browsing application of the electronic device occurring while receiving the voice command.

17. The method of claim 1, wherein the contextual information comprises a location of the electronic device when receiving the voice command.

18. The method of claim 1, wherein the contextual information comprises information from an application of the electronic device available while receiving the voice command.

19. The method of claim 1, wherein the contextual information comprises information associated with an operation occurring in a background of the electronic device while receiving the voice command.

20. The method of claim 1, further comprising:
prior to receiving the voice command:
receiving a second voice command containing a second request for media;
storing second contextual information of the electronic device, the second contextual information related to the second voice command;
after receiving the second voice command and storing the second contextual information, transmitting at least a portion of the second voice command and the stored second contextual information from the electronic device to the remote computing equipment; and
receiving, from the remote computing equipment, second media results obtained based on the second voice command and the second contextual information.

21. The method of claim 20, wherein the contextual information comprises the second media results.

22. The method of claim 20, wherein the media playback operation comprises a media player application of the electronic device playing a media object while receiving the voice command, and wherein the second media results include information associated with the media object.

23. The method of claim 20, wherein the contextual information comprises information associated with the second request for media.

24. A electronic device comprising:
a microphone;
one or more processors; and
memory storing one or more programs configured to be executed by the one or more processors, the one or more programs including instructions for:
receiving a voice command containing a request for media;
storing contextual information of the electronic device, the contextual information related to a media playback operation occurring at the electronic device while receiving the voice command;
after receiving the voice command and storing the contextual information, transmitting at least a portion of the voice command and the stored contextual information from the electronic device to remote computing equipment; and
receiving, from the remote computing equipment, media results obtained based on the voice command and the contextual information.

25. The device of claim 24, wherein the media playback operation comprises a media player application of the electronic device playing a media object while receiving the voice command.

26. The device of claim 25, wherein the media results include a second media object having a same attribute as the media object being played by the media player application.

27. The device of claim 25, wherein the contextual information includes one or more attributes related to the media object.

28. The device of claim 24, wherein the contextual information comprises a media attribute related to the media playback operation.

29. The device of claim 28, wherein the media attribute comprises a track name.

30. The device of claim 28, wherein the media attribute comprises a title.

31. The device of claim 28, wherein the media attribute comprises an artist name.

32. The device of claim 28, wherein the media attribute comprises an album name.

33. The device of claim 28, wherein the media attribute comprises a year.

34. The device of claim 28, wherein the media attribute comprises a genre.

35. The device of claim 24, wherein the voice command does not explicitly describe an attribute required to satisfy the request for media.

36. The device of claim 24, wherein the request for media is a request to search for media objects.

37. The device of claim 24, wherein the voice command includes an ambiguous term that refers to the contextual information.

38. The device of claim 24, wherein the contextual information comprises media files on the electronic device.

39. The device of claim 24, wherein the contextual information comprises information associated with a web-browsing operation of an Internet browsing application of the electronic device occurring while receiving the voice command.

40. The device of claim 24, wherein the contextual information comprises a location of the electronic device when receiving the voice command.

41. The device of claim 24, wherein the contextual information comprises information from an application of the electronic device available while receiving the voice command.

42. The device of claim 24, wherein the contextual information comprises information associated with an operation occurring in a background of the electronic device while receiving the voice command.

43. The device of claim 24, wherein the one or more programs include instructions for:
prior to receiving the voice command:
receiving a second voice command containing a second request for media;
storing second contextual information of the electronic device, the second contextual information related to the second voice command;
after receiving the second voice command and storing the second contextual information, transmitting at least a portion of the second voice command and the stored second contextual information from the electronic device to the remote computing equipment; and receiving, from the remote computing equipment, second media results obtained based on the second voice command and the second contextual information.

44. The device of claim 43, wherein the contextual information comprises the second media results.

45. The device of claim 43, wherein the media playback operation comprises a media player application of the electronic device playing a media object while receiving the voice command, and wherein the second media results include information associated with the media object.

46. The device of claim 43, wherein the contextual information comprises information associated with the second request for media.

47. A non-transitory computer-readable storage medium storing one or more programs, the one or more programs comprising instructions, which when executed by an electronic device in communication with remote computing equipment over a communications path, cause the device to:
receive a voice command containing a request for media;
store contextual information of the electronic device, the contextual information related to a media playback operation occurring at the electronic device while receiving the voice command;
after receiving the voice command and storing the contextual information, transmit at least a portion of the voice command and the stored contextual information from the electronic device to the remote computing equipment; and
receive, from the remote computing equipment, media results obtained based on the voice command and the contextual information.

48. The computer-readable storage medium of claim 47, wherein the instructions further cause the device to:
prior to receiving the voice command:
receive a second voice command containing a second request for media;
store second contextual information of the electronic device, the second contextual information related to the second voice command;
after receiving the second voice command and storing the second contextual information, transmit at least a portion of the second voice command and the stored second contextual information from the electronic device to the remote computing equipment; and
receive, from the remote computing equipment, second media results obtained based on the second voice command and the second contextual information.

* * * * *